(12) United States Patent
Yu et al.

(10) Patent No.: US 9,792,238 B2
(45) Date of Patent: Oct. 17, 2017

(54) METHOD AND APPARATUS FOR CONFIGURING A CLUSTER SYSTEM, AND SYSTEM

(71) Applicant: Huawei Technologies Co., Ltd., Shenzhen (CN)

(72) Inventors: Bin Yu, Nanjing (CN); Ningguo Shen, Nanjing (CN); Guangrong Chen, Nanjiing (CN)

(73) Assignee: Huawei Technologies co., Ltd., Shenzhen (CN)

( * ) Notice: Subject to any disclaimer, the term of this patent is extended or adjusted under 35 U.S.C. 154(b) by 350 days.

(21) Appl. No.: 14/575,896

(22) Filed: Dec. 18, 2014

(65) Prior Publication Data

US 2015/0186316 A1    Jul. 2, 2015

(30) Foreign Application Priority Data

Dec. 27, 2013    (CN) .......................... 2013 1 0739922

(51) Int. Cl.
  *G06F 13/40* (2006.01)
  *H04L 12/24* (2006.01)
  *H04L 12/26* (2006.01)
  *H04L 12/931* (2013.01)

(52) U.S. Cl.
  CPC ...... *G06F 13/4022* (2013.01); *G06F 13/4068* (2013.01); *H04L 41/0853* (2013.01); *H04L 43/0817* (2013.01); *H04L 43/12* (2013.01); *H04L 49/00* (2013.01); *H04L 49/20* (2013.01); *H04L 49/45* (2013.01)

(58) Field of Classification Search
  CPC .......................... G06F 11/3006; G06F 13/4022
  See application file for complete search history.

(56) References Cited

U.S. PATENT DOCUMENTS

| | | | |
|---|---|---|---|
| 6,738,818 B1 | 5/2004 | Shah | |
| 7,472,176 B2 * | 12/2008 | Gu | ................... H04L 29/12216 709/219 |
| 7,707,306 B2 * | 4/2010 | Ueno | .................. H04L 12/2803 709/238 |

(Continued)

FOREIGN PATENT DOCUMENTS

| | | |
|---|---|---|
| CN | 1437325 A | 8/2003 |
| CN | 1266882 C | 7/2006 |

(Continued)

*Primary Examiner* — Brian Misiura
(74) *Attorney, Agent, or Firm* — Leydig, Voit & Mayer, Ltd.

(57) ABSTRACT

Embodiments of the present invention disclose a method and apparatus for processing a cluster in a cluster system, and a cluster system, relate to the field of communications technologies, and are invented for effectively simplifying a cluster system. The method includes: sending, by switched fabric board of a member device, a request answer signal for requesting a main control board that receives the request answer signal to answer the request answer signal; and if the switched fabric board do not receive an answer signal of the request answer signal, sending, by the switched fabric board, an address of a main monitoring module to a main control board of a main device. The present invention may be applied to a clustering technology.

18 Claims, 5 Drawing Sheets

(56) References Cited

U.S. PATENT DOCUMENTS

| | | | |
|---|---|---|---|
| 7,904,535 B2* | 3/2011 | Luo | H04L 12/24 |
| | | | 709/208 |
| 8,155,114 B2* | 4/2012 | Zhang | H04L 12/40006 |
| | | | 370/254 |
| 9,363,282 B1* | 6/2016 | Yu | H04L 63/1425 |
| 9,405,757 B2* | 8/2016 | Zhao | H04L 67/1097 |
| 9,577,871 B2* | 2/2017 | Xia | H04L 45/58 |
| 2004/0088606 A1 | 5/2004 | Robinson et al. | |
| 2005/0102384 A1 | 5/2005 | Ueno et al. | |
| 2006/0041650 A1 | 2/2006 | Luo et al. | |
| 2014/0172949 A1* | 6/2014 | Song | H04L 45/46 |
| | | | 709/202 |
| 2016/0285602 A1* | 9/2016 | Fang | H04W 24/02 |

FOREIGN PATENT DOCUMENTS

| | | |
|---|---|---|
| CN | 1326367 C | 7/2007 |
| EP | 2747351 A1 | 6/2014 |
| JP | 2004152274 A | 5/2004 |
| JP | 2006508469 A | 3/2006 |
| WO | WO 2004051474 A2 | 6/2004 |
| WO | WO 2012162953 A1 | 6/2012 |
| WO | WO 2013173181 A1 | 11/2013 |

\* cited by examiner

METHOD AND APPARATUS FOR CONFIGURING A CLUSTER SYSTEM, AND SYSTEM

CROSS-REFERENCE TO RELATED APPLICATION

This application claims priority to Chinese Patent Application No. 201310739922.X, filed on Dec. 27, 2013, which is hereby incorporated by reference in its entirety.

TECHNICAL FIELD

The application relates to the communications field, and in particular, to a method and apparatus for processing a cluster in a cluster system, and a system.

BACKGROUND

A cluster system includes two or multiple devices. These devices work together in a same group, so as to collaboratively implement a task. Therefore, the cluster system has a capability of a sum of capabilities of the multiple devices; and the multiple devices in the cluster system may be managed and maintained as one device, simplifying operations.

Generally, a main control board is configured for each device in the cluster system, and the main control board is also referred to as a super engine, or a routing processing board, or a main control processing unit. When devices are working normally, running statuses of a line card board and a switched fabric board inside each device are supervised by the main control board, and communication between line card boards in different devices also needs to be controlled by the main control board in each device. Generally, for consideration of reliability, each device includes at least two main control boards, so that when one main control board is faulty, the other main control board takes over work of the one main control board.

However, in the foregoing clustering implementation process, at least one main control board needs to be disposed in each device in a cluster system, which makes the cluster system complex.

SUMMARY

The application provides a method and apparatus for processing a cluster in a cluster system, and a system, so that on the basis of ensuring reliability of a cluster system, a main control board does not need to be disposed for all devices in the cluster system, thereby simplifying the cluster system.

According to a first aspect of the application, a method for processing a cluster in a cluster system is provided, which is applied to a member device, where the member device includes a main monitoring module, and the method includes:

sending, by a switched fabric board of the member device, a request answer signal for requesting a main control board that receives the request answer signal to answer the request answer signal; and if the switched fabric board do not receive an answer signal of the request answer signal, sending, by the switched fabric board, an address of the main monitoring module to a main control board of a main device.

In a first possible implementation manner of the first aspect, after the switched fabric board do not receive an answer signal of the request answer signal, before the sending, by the switched fabric board, an address of the main monitoring module to a main control board of a main device, the method further includes:

determining, by the switched fabric board, the address of the main monitoring module, where a result of the determining includes that: the main monitoring module is located on one switched fabric board of the switched fabric board, or the main monitoring module is independent of any switched fabric board of the switched fabric board.

With reference to the first possible implementation manner of the first aspect, in a second possible implementation manner of the first aspect, if the main monitoring module is located on one switched fabric board of the switched fabric board, the method further includes:

determining whether the switched fabric board on which the main monitoring module is located lacks cluster configuration information of the cluster system;

if the switched fabric board on which the main monitoring module is located lacks the cluster configuration information of the cluster system, sending, by the switched fabric board, a cluster configuration information request to the main control board of the main device of the cluster system, so that the main control board of the main device responds to the request and sends the cluster configuration information to the switched fabric board; and when the main control board of the main device responds to the request and sends the cluster configuration information to the switched fabric board, receiving and saving, by the switched fabric board, the cluster configuration information sent by the main control board of the main device.

With reference to the first possible implementation manner of the first aspect, in a third possible implementation manner of the first aspect, if the main monitoring module is independent of any switched fabric board of the switched fabric board, the method further includes:

determining that the main monitoring module is associated with one switched fabric board of the switched fabric board;

determining whether the switched fabric board associated with the main monitoring module lacks cluster configuration information of the cluster system;

if the switched fabric board associated with the main monitoring module lacks the cluster configuration information of the cluster system, sending, by the switched fabric board, a cluster configuration information request to the main control board of the main device of the cluster system, so that the main control board of the main device responds to the request and sends the cluster configuration information to the switched fabric board; and when the main control board of the main device responds to the request and sends the cluster configuration information to the switched fabric board, receiving and saving, by the switched fabric board, the cluster configuration information sent by the main control board of the main device.

With reference to the first possible implementation manner of the first aspect or the second possible implementation manner of the first aspect, in a fourth possible implementation manner of the first aspect, after the receiving and saving, by the switched fabric board, the cluster configuration information sent by the main control board of the main device, the method further includes:

synchronously saving the cluster configuration information on another switched fabric board of the member device.

With reference to any one of the second possible implementation manner of the first aspect, the third possible implementation manner of the first aspect, and the fourth possible implementation manner of the first aspect, in a fifth possible implementation manner of the first aspect, after the receiving and saving, by the switched fabric board, the cluster configuration information sent by the main control board of the main device, the method further includes:

if the switched fabric board detects a request answer signal sent by a main control board on the member device, determining that a monitoring module on the main control board is used as the main monitoring module; and when determining that the monitoring module on the main control board is used as the main monitoring module, sending, by the main control board, the cluster configuration information request to the main control board of the main device in the cluster system; and when the main control board of the main device responds to the request and sends the cluster configuration information, receiving and saving, by the main control board of the member device, the cluster configuration information sent by the main control board of the main device.

With reference to any one of the second possible implementation manner of the first aspect, the third possible implementation manner of the first aspect, the fourth possible implementation manner of the first aspect, and the fifth possible implementation manner of the first aspect, in a sixth possible implementation manner of the first aspect, after the switched fabric board do not receive an answer signal of the request answer signal, the method further includes:

determining, by the switched fabric board of the member device, whether the switched fabric board of the member device is connected to a switched fabric board of the main device.

According to a second aspect of the application, an apparatus for processing a cluster in a cluster system is provided, which is applied to a member device, where the member device includes a main monitoring module, and the apparatus includes:

a request answer signal sending unit, configured to enable a switched fabric board of the member device to send a request answer signal for requesting a main control board that receives the request answer signal to answer the request answer signal; and a main monitoring module address sending unit, configured to, if the switched fabric board does not receive an answer signal of the request answer signal, enable the switched fabric board to send an address of the main monitoring module to a main control board of a main device.

In a first possible implementation manner of the second aspect, the apparatus further includes:

a determining unit, configured to enable the switched fabric board to determine the address of the main monitoring module, where a result of the determining includes that: the main monitoring module is located on one switched fabric board of the switched fabric board, or the main monitoring module is independent of any switched fabric board of the switched fabric board.

With reference to the first possible implementation manner of the second aspect, in a second possible implementation manner of the second aspect, if the main monitoring module is located on one switched fabric board of the switched fabric board, the determining unit is further configured to determine whether the switched fabric board on which the main monitoring module is located lacks cluster configuration information of the cluster system; and the apparatus further includes:

a cluster configuration information request sending unit, configured to, if the determining unit determines that the switched fabric board on which the main monitoring module is located lacks the cluster configuration information of the cluster system, enable the switched fabric board to send a cluster configuration information request to the main control board of the main device of the cluster system, so that the main control board of the main device responds to the request and sends the cluster configuration information to the switched fabric board; and a saving unit, configured to, when the main control board of the main device responds to the request and sends the cluster configuration information to the switched fabric board, enable the switched fabric board to receive and save the cluster configuration information sent by the main control board of the main device.

With reference to the first possible implementation manner of the second aspect, in a third possible implementation manner of the second aspect, if the main monitoring module is independent of any switched fabric board of the switched fabric board, the determining unit is further configured to determine that the main monitoring module is associated with one switched fabric board of the switched fabric board, and determine whether the switched fabric board associated with the main monitoring module lacks the cluster configuration information of the cluster system;

the cluster configuration information request sending unit is further configured to, if the switched fabric board associated with the main monitoring module lacks the cluster configuration information of the cluster system, enable the switched fabric board to send the cluster configuration information request to the main control board of the main device of the cluster system, so that the main control board of the main device responds to the request and sends the cluster configuration information to the switched fabric board; and the saving unit is further configured to, when the main control board of the main device responds to the request and sends the cluster configuration information to the switched fabric board, enable the switched fabric board to receive and save the cluster configuration information sent by the main control board of the main device.

With reference to the second possible implementation manner of the second aspect or the third possible implementation manner of the second aspect, in a fourth possible implementation manner of the second aspect, the saving unit is further configured to synchronously save the cluster configuration information on another switched fabric board of the member device.

With reference to any one of the second possible implementation manner of the second aspect, the third possible implementation manner of the second aspect, and the fourth possible implementation manner of the second aspect, in a fifth possible implementation manner of the second aspect, the apparatus further includes:

the determining unit is further configured to, if the switched fabric board detects a request answer signal sent by a main control board on the member device, determine that a monitoring module on the main control board is used as the main monitoring module;

the cluster configuration information request sending unit is further configured to, when the determining unit determines that the monitoring module on the main control board is used as the main monitoring module, enable the main control board to send the cluster configuration information request to the main control board of the main device in the cluster system; and the saving unit is further configured to, when the main control board of the main device responds to the request and sends the cluster configuration information, enable the main control board of the member device to receive and save the cluster configuration information sent by the main control board of the main device.

With reference to any one of the second possible implementation manner of the second aspect, the third possible implementation manner of the second aspect, the fourth possible implementation manner of the second aspect, and the fifth possible implementation manner of the second aspect, in a sixth possible implementation manner of the second aspect, the determining unit is further configured to enable the switched fabric board of the member device to determine whether the switched fabric board of the member device are connected to a switched fabric board of the main device.

According to a third aspect of the application, a cluster system is provided, including:

one main device, at least one member device, and an apparatus for processing a cluster applied to the at least one member device, where the member device includes a main monitoring module, where:

the apparatus for processing a cluster is specifically configured to:

enable a switched fabric board of the member device to send a request answer signal for requesting a main control board that receives the request answer signal to answer the request answer signal; and if the switched fabric board do not receive an answer signal of the request answer signal, enable the switched fabric board to send an address of the main monitoring module to a main control board of a main device.

The method and apparatus for processing a cluster in a cluster system, and the cluster system provided in the application are applied to a member device, where the member device includes a main monitoring module. A switched fabric board of the member device send a request answer signal, and a main control board that receives the request answer signal answers the request answer signal; and if the switched fabric board do not receive an answer signal of the request answer signal, the switched fabric board send an address of the main monitoring module to a main control board of a main device. In this way, a problem that at least one main control board is disposed in each device in the cluster system is avoided. On the basis of ensuring reliability of the cluster system, the main control board does not need to be disposed in the member device in the cluster system, thereby simplifying the cluster system and reducing costs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
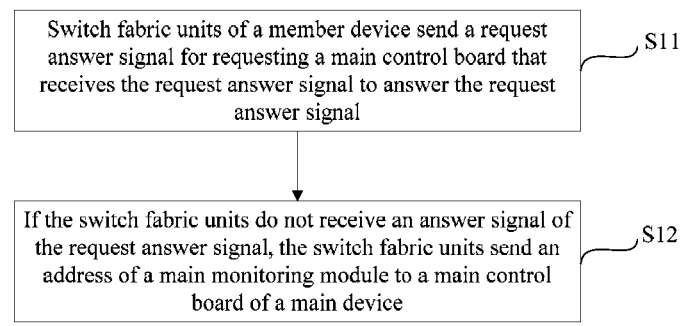
FIG. 1 is a schematic flowchart of a method for processing a cluster in a cluster system according to Embodiment 1 of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A cluster system includes one main device and at least one member device. The main device controls and supervises running statuses of all devices in the cluster system. In the main device, at least one main control board and at least one switched fabric board are disposed, where the main control board of the main device is configured to control all the devices in the entire cluster system. In addition, a monitoring module disposed on the main control board is generally considered as a main monitoring module, where the main monitoring module collects monitoring information of monitoring modules disposed on other boards, to monitor running statuses of all boards in the main device. The foregoing other boards refer to a main control board except the main control board on which the main monitoring module is located, a switched fabric board, and a line card board in the main device. When the main device is in the cluster system, the switched fabric board of the main device is connected to a switched fabric board of a member device by using a clustering cable, so that the main device can perform information exchange with the member device. In a member device, at least one switched fabric board is disposed, where the switched fabric board is configured to, when the member device is in the cluster system, be connected to the switched fabric board of the main device by using a clustering cable, so that the member device can perform information exchange with the main device. In addition, the member device is also disposed with a main monitoring module that monitors running statuses of boards in the member device. The running statuses of boards refer to a main control board, the switched fabric board, and a line card board in the member device.

It can be learned that, in the cluster system, the main control board, which includes the main monitoring module, in the main device monitors and controls a running status of the main device, and the main control board of the main device also controls a running status of a member device. The member device sends the running status of the member device to the main control board of the main device, so that the main control board of the main device performs control and management.

Generally, the monitoring module on the main control board of the member device is used as the main monitoring module. However, in the present invention, after a switched fabric board of the member device send a request answer signal, if the switched fabric board receive an answer signal of the request answer signal, the monitoring module on the main control board of the member device is used as the main monitoring module; and if the switched fabric board do not receive an answer signal of the request answer signal, one monitoring module is selected from all monitoring modules in the member device as the main monitoring module.

Embodiment 1

Embodiment 1 of the present invention provides a method for processing a cluster in a cluster system, which is applied to a member device, where the member device includes a main monitoring module. As shown in FIG. 1, the method includes the following steps:

S11: A switched fabric board of the member device send a request answer signal for requesting a main control board that receives the request answer signal to answer the request answer signal.

The switched fabric board may periodically send a request answer signal. For example, the switched fabric board send, in a cycle of 0.3 seconds, a request answer signal for requesting a main control board that receives the request answer signal to answer the request answer signal.

S12: If the switched fabric board do not receive an answer signal of the request answer signal, the switched fabric board send an address of the main monitoring module to a main control board of a main device.

In this step, it may be set that: if the switched fabric board do not receive an answer signal of the request answer signal within a preset time, for example, the switched fabric board do not receive the answer signal of the request answer signal within 2 seconds, the switched fabric board send the address of the main monitoring module to the main control board of the main device. The following two cases may cause that the answer signal sent by the main control board is not received within the preset time: in a first case, a quantity of main control boards in the member device is zero; and in a second case, a main control board in the member device is faulty.

Specifically, monitoring modules are disposed in both the main control board and the switched fabric board. In a case in which the request answer signal sent by the main control board is detected, the monitoring module on the main control board is used as the main monitoring module. The main monitoring module is configured to collect data, which is recorded by monitoring modules on the switched fabric board and a line card board, of running statuses of boards. The boards refer to boards corresponding to the monitoring modules or boards on which the monitoring modules are located. For example, a monitoring module corresponding to a line card board A records a running status of the line card board A, and then the main monitoring module collects data, which is recorded by the monitoring module corresponding to the line card board A, of a running status of the line card board A. In addition, the data of the running status includes data such as a temperature, a voltage, and a power supply status of a board; and data of a running status of a main control board on which the main monitoring module is located is provided together to the main control board. In a case in which the request answer signal sent by the main control board is not detected within a preset time, the switched fabric board determine an address of the main monitoring module, and send the address of the main monitoring module to the main control board of the main device. Optionally, in a specific embodiment of the present invention, a result of the determining an address of the main monitoring module includes the following two cases: in a first case, the main monitoring module is located on one switched fabric board of the switched fabric board; in a second case, the main monitoring module is independent of any switched fabric board of the switched fabric board, that is, the main monitoring module exists independent of the switched fabric board. In addition, a manner of the determining an address of the main monitoring module may be specifying a monitoring module in advance, or may be selecting, by the switched fabric board, one monitoring module from all monitoring modules in the member device as the main monitoring module. Optionally, for example, a monitoring module on a switched fabric board, among the switched fabric boards, that has been connected to a clustering cable is selected as the main monitoring module.

Specifically, in the first case described above, that is, in the case in which the quantity of main control boards in the member device is zero, one monitoring module is selected, from monitoring modules that are disposed on the switched fabric boards, as the main monitoring module. The selected main monitoring module sends to the switched fabric board a message that the selected main monitoring module is upgraded to "main monitoring", and sends an address of the main monitoring module to the main control board of the main device in the cluster system by using the switched fabric board, so that the main control board of the main device learns a position of the main monitoring module of the member device. In this way, the main monitoring module provides collected data of running statuses of boards in the member device to the main control board of the main device in the cluster system. The boards refer to running statuses of all switched fabric boards and line card boards in the member device.

In the second case described above, that is, in the case in which the main control board in the member device is faulty, the member device does not restart, and changes the main monitoring module from a monitoring module located on the main control board to a monitoring module located on the switched fabric board. In this way, the member device does not need to be restarted, thereby avoiding a problem of data loss and improving reliability of the cluster system.

Because the main monitoring module of the member device may not be on the main control board, in a case in which the main control board is faulty and there is no main control board in the member device, the main monitoring module that does not rely on the main control board can still monitor a switched fabric board and a line card board in the member device. Therefore, in a monitoring environment, it is ensured that a switched fabric board and a line card board in the member device can still run normally in a case in which the member device does not have a main control board.

Further, in a specific embodiment of the present invention, if the main monitoring module is located on one switched fabric board of the switched fabric boards, the method for processing a cluster further includes the following steps: Determine whether the switched fabric board on which the main monitoring module is located lacks cluster configuration information of the cluster system; and if the switched fabric board on which the main monitoring module is located lacks the cluster configuration information of the cluster system, the switched fabric board on which the main monitoring module is located sends a cluster configuration information request to the main control board of the main device of the cluster system. The main control board of the main device responds to the request and sends the cluster configuration information to the switched fabric board on which the main monitoring module is located. The switched fabric board on which the main monitoring module is located receives and saves the cluster configuration information sent by the main control board of the main device.

Alternatively, in a specific embodiment of the present invention, if the main monitoring module is independent of any switched fabric board of the switched fabric boards, the method for processing a cluster further includes the following steps: Determine that the main monitoring module is associated with one switched fabric board of the switched fabric boards; determine whether the switched fabric board associated with the main monitoring module lacks cluster configuration information of the cluster system; if the switched fabric board associated with the main monitoring module lacks the cluster configuration information of the cluster system, the switched fabric board sends a cluster configuration information request to the main control board of the main device of the cluster system; the main control board of the main device responds to the request and sends the cluster configuration information to the switched fabric board; and the switched fabric board receives and saves the cluster configuration information sent by the main control board of the main device.

The cluster configuration information may specifically include a cluster ID of the member device (that is, a member number of the member device) and a cluster priority.

Specifically, when the cluster configuration information includes a cluster ID, the cluster ID is used to identify devices in the cluster system; and all the devices in the cluster system have a unique cluster ID. For example, the cluster IDs may be A, B, and C, and in this case, the devices in the cluster system are identified as a device A, a device B, and a device C.

When the cluster configuration information includes a cluster priority, the cluster priority is used to determine a role of a member device during a role election process of the cluster system, that is, in the cluster system, which device is used as the main device, and which devices are used as member devices in the cluster system are determined. It can be understood that, in this embodiment of the present invention, because the main monitoring module may change from a monitoring module located on the main control board to a monitoring module located on the switched fabric board, in a changing process, a cluster priority of the device in the cluster system changes; therefore, in the foregoing changing process, the device needs to send a resource configuration request, and the device and the main device enter a cluster competition stage.

By using that a cluster system includes three devices of which cluster IDs are identified as A, B, and C as an example, the foregoing process of role election in the cluster system is described below in detail.

For example, the cluster system includes three devices A, B, and C, where a device A has a main control board, and a device B and a device C do not have a main control board. When a detection result is that only the device A has a main control board, a higher priority is set for the device A than those of the devices B and C. Because among the three devices A, B, and C, a priority of the device A is the highest, it may be determined that the device A is used as a main device in the cluster system; and because the devices B and C do not have a main control board and have a priority lower than that of the device A, the devices B and C are both used as a member device in the cluster system.

For another example, the cluster system includes three devices A, B, and C, where the devices A and B have a main control board, and the device C does not have a main control board. When a detection result is that the devices A and B have a main control board, the devices A and B may enter a general cluster competition stage. In this stage, the devices A and B negotiate and determine that one device of the devices A and B is used as a main device of the cluster system, and the other device may be used as a member device of the cluster system; however, the member device has a special use, and the use is to replace all services of the main device when the main device is faulty. Because the cluster competition stage is the same as the prior art, it is not further described in the present invention. Because the device C does not have a main control board and has a priority lower than those of the devices A and B, the device C is used as a member device in the cluster system.

Further, in a specific embodiment of the present invention, after the main control board of the main device responds to the request and sends the cluster configuration information to the switched fabric board, which includes the main monitoring module, of the member device, when the switched fabric board receives and saves the cluster configuration information sent by the main control board of the main device, the cluster configuration information may also be synchronously saved on another switched fabric board of the member device. By using this step, after that the switched fabric board currently including the main monitoring module is faulty is detected, the main monitoring module needs to be determined again, that is, one monitoring module is selected from monitoring modules on other switched fabric boards of the member device as the main monitoring module; and then the switched fabric board including the main monitoring module does not need to request the cluster configuration information from the main control board of the main device, but directly acquires from the cluster configuration information that is synchronously saved before, thereby reducing a workload of the main control board of the main device.

Optionally, in a specific embodiment of the present invention, after the switched fabric board does not receive an answer signal of the request answer signal, the following step may further be included: The switched fabric board of the member device determines whether the switched fabric board of the member device are connected to a switched fabric board of the main device.

It can be understood that the foregoing step of determining whether the switched fabric board of the member device are connected to a switched fabric board of the main device and the step of waiting, by the switched fabric board, for receiving an answer signal of the request answer signal within a preset time may be performed successively, or may be performed simultaneously; and when the two steps are performed simultaneously, system waiting time can be shortened.

Further, in a specific embodiment of the present invention, after saving, by the switched fabric board, the received cluster configuration information, the following steps may further be included:

Firstly, if the switched fabric board detects a request answer signal sent by the main control board on the member device, determine that a monitoring module on the main control board is used as the main monitoring module; next, when that the monitoring module on the main control board is used as the main monitoring module is determined, the main control board sends a cluster configuration information request to the main control board of the main device in the cluster system; and then when the main control board of the main device responds to the request and sends the cluster configuration information, the main control board of the member device receives and saves the cluster configuration information sent by the main control board of the main device.

The detecting, by the switched fabric board, a request answer signal sent by the main control board may specifically include cases such as completing changing the main control board, or troubleshooting the main control board, or newly inserting a main control board.

Specifically, that a main control board has a more effective control capability, and that a communication line between the main control board and other boards in the device is shorter are taken into consideration, where the other boards refer to a switched fabric board and a line card board. Therefore, an implementation manner that a monitoring module on a main control board is used as a main monitoring module is better than an implementation manner that a monitoring module on a switched fabric board is used as a main monitoring module. Therefore, after the monitoring module on the switched fabric board is used as a main monitoring module, the switched fabric board still regularly sends a request answer signal to the main control board. When detecting or receiving the request answer signal sent by the main control board again, the switched fabric board may determine that the monitoring module on the main control board is used as the main monitoring module. After that the monitoring module on the main control board is used as the main monitoring module is determined, because the main monitoring module changes from the monitoring module on the switched fabric board to the monitoring module on the main control board, a cluster priority of the device in the cluster system changes, and therefore, the main control board of the member device sends a cluster configuration information request to the main control board of the main device. At this time, the main device and the device in the cluster system may enter a cluster competition stage. If a competition result is that a priority of the device is higher than a priority of the main device, the device is selected as the main device; and if a competition result is that a priority of the device is lower than a priority of the main device, the device is still used as a member device of the main device.

It can be learned that the member device can complete position changing of a main monitoring module without interrupting operation.

The method for processing a cluster in a cluster system provided in Embodiment 1 of the present invention is applied to a member device, where the member device includes a main monitoring module. A switched fabric board of the member device send a request answer signal, and a main control board that receives the request answer signal answers the request answer signal; and if the switched fabric board do not receive an answer signal of the request answer signal within a preset time, the switched fabric board send an address of the main monitoring module to a main control board of a main device. In this way, a problem that at least one main control board is disposed in each device in the cluster system is avoided. On the basis of ensuring reliability of the cluster system, the main control board does not need to be disposed in the member device in the cluster system, thereby simplifying the cluster system and reducing costs.

Embodiment 2

Figure 2:
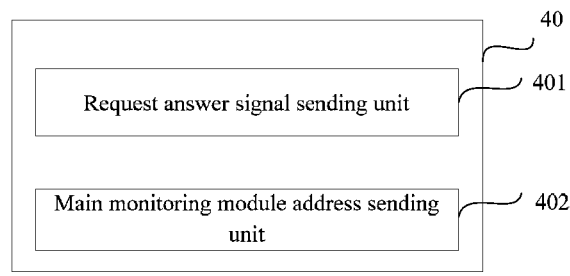
FIG. 2 is a schematic structural diagram of an apparatus for processing a cluster in a cluster system according to Embodiment 2 of the present invention.

Corresponding to Embodiment 1, Embodiment 2 of the present invention further provides an apparatus 40 for processing a cluster in a cluster system, which is applied to a member device, where the member device includes a main monitoring module. As shown in FIG. 2, the apparatus includes:

a request answer signal sending unit 401, configured to enable a switched fabric board of the member device to send a request answer signal for requesting a main control board that receives the request answer signal to answer the request answer signal; and a main monitoring module address sending unit 402, configured to, if the switched fabric board do not receive an answer signal of the request answer signal, enable the switched fabric board to send an address of the main monitoring module to a main control board of a main device.

In the apparatus 40 for processing a cluster in a cluster system provided in Embodiment 2 of the present invention, the request answer signal sending unit 401 is configured to enable switched fabric board of the member device to send a request answer signal for requesting a main control board that receives the request answer signal to answer the request answer signal; and the main monitoring module address sending unit 402 is configured to, if the switched fabric board does not receive an answer signal of the request answer signal, enable the switched fabric board to send an address of the main monitoring module to a main control board of a main device. It can be learned that, by using the apparatus, a problem that at least one main control board is disposed in each device in the cluster system is overcome. In a case in which normal operation is ensured, the main control board does not need to be disposed in the member device in a cluster system, thereby reducing costs.

Figure 3:
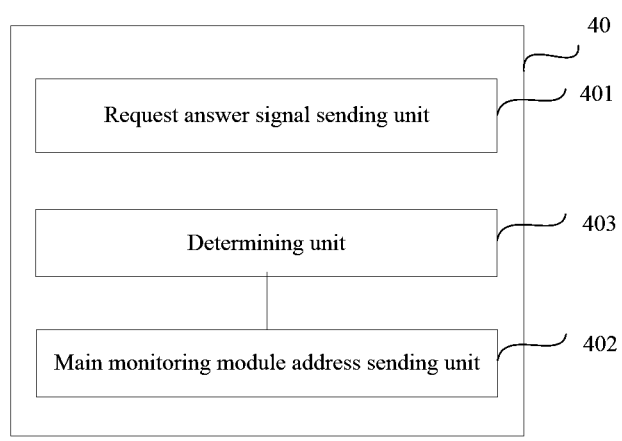
FIG. 3 is another schematic structural diagram of an apparatus for processing a cluster in a cluster system according to Embodiment 2 of the present invention.

Further, in a specific embodiment of the present invention, as shown in FIG. 3, the apparatus 40 further includes: a determining unit 403, configured to enable the switched fabric board to determine the address of the main monitoring module, where a result of the determining includes that: the main monitoring module is located on one switched fabric board of the switched fabric boards, or the main monitoring module is independent of any switched fabric board of the switched fabric boards.

Further, in a specific embodiment of the present invention, if the main monitoring module is located on one switched fabric board of the switched fabric boards, in this case, the determining unit 403 is further configured to determine whether the switched fabric board on which the main monitoring module is located lacks cluster configuration information of the cluster system.

Figure 4:
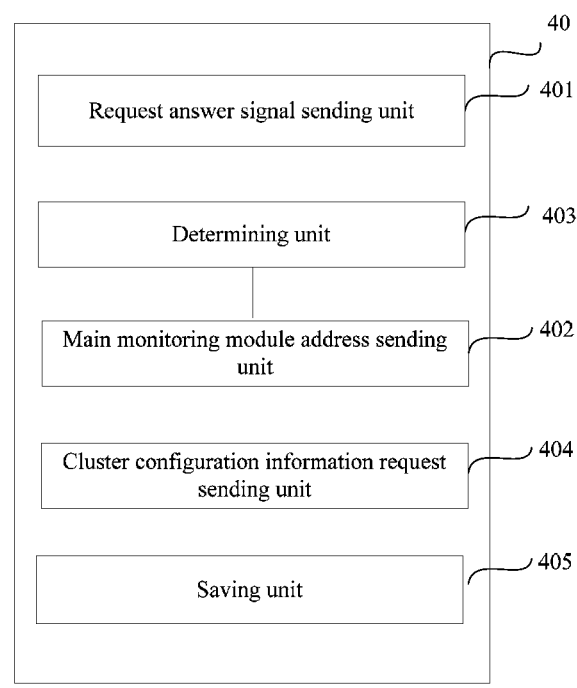
FIG. 4 is another schematic structural diagram of an apparatus for processing a cluster in a cluster system according to Embodiment 2 of the present invention.

In this case, as shown in FIG. 4, the apparatus 40 further includes:

a cluster configuration information request sending unit 404, configured to, if the determining unit 403 determines that the switched fabric board on which the main monitoring module is located lacks the cluster configuration information of the cluster system, enable the switched fabric board to send a cluster configuration information request to the main control board of the main device of the cluster system, so that the main control board of the main device responds to the request and sends a cluster configuration information service to the switched fabric board; and a saving unit 405, configured to, when the main control board of the main device responds to the request and sends the cluster configuration information to the switched fabric board, enable the switched fabric board to receive and save the cluster configuration information sent by the main control board of the main device.

Optionally, in a specific embodiment of the present invention, if the main monitoring module is independent of any switched fabric board of the switched fabric boards, in this case, the determining unit 403 is further configured to determine that the main monitoring module is associated with one switched fabric board of the switched fabric boards, and determine whether the switched fabric board associated with the main monitoring module lacks cluster configuration information of the cluster system.

In this case, the cluster configuration information request sending unit 404 is further configured to, if the switched fabric board associated with the main monitoring module lacks the cluster configuration information of the cluster system, enable the switched fabric board to send a cluster configuration information request to the main control board of the main device of the cluster system, so that the main control board of the main device responds to the request and sends the cluster configuration information to the switched fabric board; and the saving unit 405 is further configured to, when the main control board of the main device responds to the request and sends the cluster configuration information to the switched fabric board, enable the switched fabric board to receive and save the cluster configuration information sent by the main control board of the main device.

Optionally, in a specific embodiment of the present invention, the saving unit 405 is further configured to synchronously save the cluster configuration information on another switched fabric board of the member device.

Optionally, in a specific embodiment of the present invention, the determining unit 403 is further configured to, if the switched fabric board detects a request answer signal sent by a main control board on the member device, determine that a monitoring module on the main control board is used as the main monitoring module; the cluster configuration information request sending unit 404 is further configured to, when the determining unit determines that the monitoring module on the main control board is used as the main monitoring module, enable the main control board to send the cluster configuration information request to the main control board of the main device in the cluster system; and the saving unit 405 is further configured to, when the main control board of the main device responds to the request and sends the cluster configuration information, enable the main control board of the member device to receive and save the cluster configuration information sent by the main control board of the main device.

Optionally, in a specific embodiment of the present invention, the determining unit 403 is further configured to enable the switched fabric board of the member device to determine whether the switched fabric board of the member device are connected to a switched fabric board of the main device.

It should be noted that, for specific functions of structural units of the apparatus 40 for processing a cluster in a cluster system provided in Embodiment 2 of the present invention, refer to the foregoing method Embodiment 1.

Embodiment 3

Figure 5:
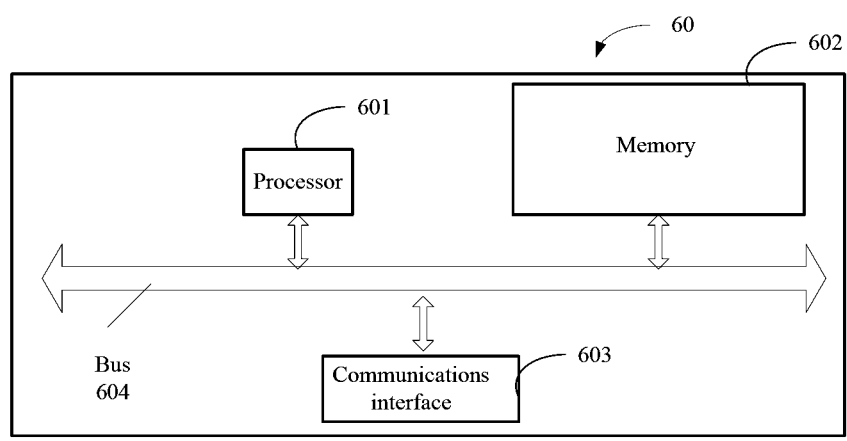
FIG. 5 is a schematic structural diagram of an apparatus for processing a cluster in a cluster system according to Embodiment 3 of the present invention.

Corresponding to Embodiment 1, FIG. 5 shows another embodiment of the apparatus for processing a cluster provided in the present invention. As shown in FIG. 5, the apparatus 60 for processing a cluster provided in this embodiment includes a processor 601, a memory 602, a communications interface 603, and a bus 604. The processor 601, memory 602, and communications interface 603 are connected by using the bus 604 and complete communication between each other. The bus 604 may be an Industrial Standard Architecture (ISA) bus, a Peripheral Component Interconnect (PCI) bus, an Extended Industry Standard Architecture (EISA) bus, or the like. The bus 604 may be classified into an address bus, a data bus, a control bus, and the like. For the convenience of representation, only one thick line is used for representing in FIG. 5, but does not represent only one bus or one type of bus, where:

The memory 602 is configured to store executable program code, where the program code includes a computer operation instruction. The memory 602 may include a high speed RAM memory, and may also include a non-volatile memory, for example, at least one disk memory.

The processor 601 runs a program corresponding to the executable program code by reading the executable program code stored in the memory 602, so as to be configured to: enable a switched fabric board of the member device to send a request answer signal for requesting a main control board that receives the request answer signal to answer the request answer signal; and if the switched fabric board do not receive an answer signal of the request answer signal, enable the switched fabric board to send an address of the main monitoring module to a main control board of a main device.

The processor 601 may be a central processing unit (CPU for short), or be configured as one or multiple integrated circuits in this embodiment of the present invention.

It should be noted that, besides the foregoing functions, the processor 601 may further be configured to perform other processes in the foregoing method embodiment, which is not further described herein.

It should further be noted that, for division of functional units in the processor 601, refer to the foregoing embodiment of the apparatus 60 for processing a cluster, which is not further described herein.

Embodiment 4

Figure 6:
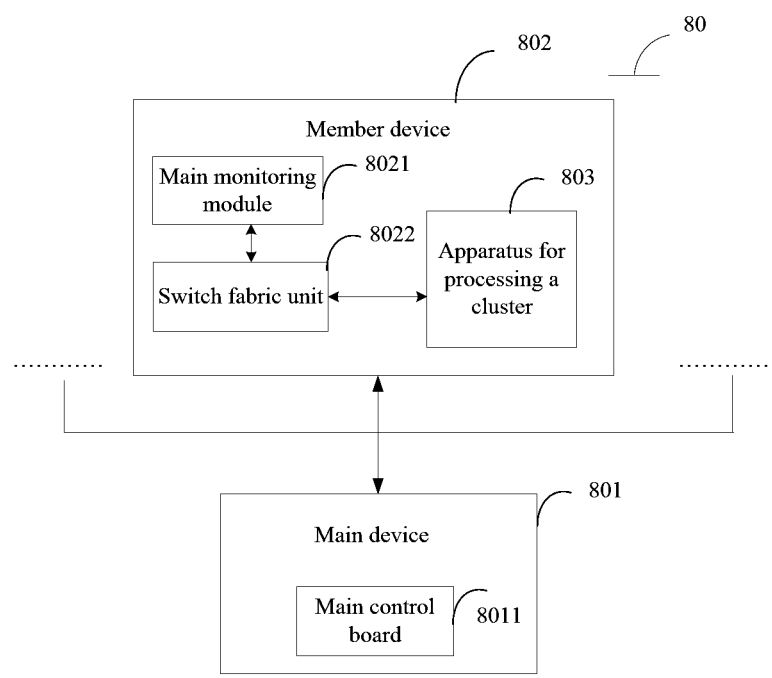
FIG. 6 is a schematic system architecture diagram of a cluster system according to Embodiment 4 of the present invention.

Correspondingly, Embodiment 4 of the present invention further provides a cluster system 80. As shown in FIG. 6, the system includes a main device 801, at least one member device 802, and an apparatus 803 for processing a cluster applied to the member device, where the member device 802 includes a main monitoring module 8021, where:

the apparatus 803 for processing a cluster is specifically configured to:

enable switched fabric board 8022 of the member device 802 to send a request answer signal for requesting a main control board that receives the request answer signal to answer the request answer signal; and if the switched fabric board 8022 of the member device 802 do not receive an answer signal of the request answer signal, enable the switched fabric board 8022 to send an address of the main monitoring module to a main control board 8011 of the main device 801.

According to the cluster system 80 provided in Embodiment 4 of the present invention, in the system, switched fabric board of the member device 802 send a request answer signal for requesting a main control board that receives the request answer signal to answer the request answer signal; and if the switched fabric board of the member device 802 do not receive an answer signal of the request answer signal, the switched fabric board send an address of the main monitoring module to a main control board of the main device 801. It can be learned that, by using the system, a problem that at least one main control board is disposed in each device in the cluster system is overcome. In a case in which normal operation is ensured, the main control board does not need to be disposed in the member device in the cluster system, thereby simplifying the cluster system and reducing cost.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment.

It should be noted that the described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. In addition, in the accompanying drawings of the apparatus embodiments provided by the present invention, a connection relationship between modules represents a communication connection between the modules, which may be implemented as one or more communication buses or signal cables. A person of ordinary skill in the art may understand and implement the embodiments of the present invention without creative efforts.

Based on the foregoing descriptions of the embodiments, a person skilled in the art may clearly understand that the present invention may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, for the present invention, a software program is a preferred implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random-access memory (RAM), a magnetic disk, or an optical disc of a computer, and includes several instructions for instructing a computer device (which may be a personal computer, a server, a network device, and the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for configuring a cluster system including a member device and a main device, wherein the member device comprises at least one monitoring module and at least one switched fabric board and the method comprises:

sending, by a switched fabric board of the member device, a request answer signal for requesting a main control board that receives the request answer signal to answer the request answer signal;

determining, by the switched fabric board of the member device, an address of a main monitoring module when the switched fabric board of the member device does not receive an answer signal of the request answer signal wherein the main monitoring module is one of the at least one monitoring module, wherein a result of the determining comprises that: the main monitoring module is located on one of the at least one switched fabric board; and sending, by the switched fabric board, the address of the main monitoring module to a main control board of the main device.

2. The method according to claim 1, further comprises:

determining whether the switched fabric board on which the main monitoring module is located lacks cluster configuration information of the cluster system;

when the switched fabric board on which the main monitoring module is located lacks the cluster configuration information of the cluster system, sending, by the switched fabric board, a cluster configuration information request to the main control board of the main device of the cluster system, to enable the main control board of the main device to respond-to the request and to send the cluster configuration information to the switched fabric board; and when the main control board of the main device responds to the request and sends the cluster configuration information to the switched fabric board, receiving and saving, by the switched fabric board, the cluster configuration information sent by the main control board of the main device.

3. The method according to claim 2, wherein after receiving and saving the cluster configuration information sent by the main control board of the main device, the method further comprises:

synchronously saving the cluster configuration information on another switched fabric board of the member device.

4. The method according to claim 2, wherein after receiving and saving the cluster configuration information sent by the main control board of the main device, the method further comprises:

when the switched fabric board detects a request answer signal sent by a main control board on the member device, determining that a monitoring module on the main control board is used as the main monitoring module; and when determining that the monitoring module on the main control board is used as the main monitoring module, sending, by the main control board, the cluster configuration information request to the main control board of the main device in the cluster system; and when the main control board of the main device responds to the request and sends the cluster configuration information, receiving and saving, by the main control board of the member device, the cluster configuration information sent by the main control board of the main device.

5. The method according to claim 1, wherein after the switched fabric board does not receive the answer signal of the request answer signal, the method further comprises:

determining, by the switched fabric board of the member device, whether the switched fabric board of the member device is connected to a switched fabric board of the main device.

6. The method according to claim 1, wherein after the switched fabric board does not receive the answer signal of the request answer signal, before sending the address of the main monitoring module to the main control board of the main device, the method further comprises:
  determining, by the switched fabric board, the address of the main monitoring module, wherein a result of the determining comprises that: the main monitoring module is independent of any of the at least one switched fabric board.

7. The method according to claim 6, further comprises:
  determining that the main monitoring module is associated with one of the at least one switched fabric board;
  determining whether the switched fabric board associated with the main monitoring module lacks cluster configuration information of the cluster system;
    when the switched fabric board associated with the main monitoring module lacks the cluster configuration information of the cluster system, sending, by the switched fabric board, a cluster configuration information request to the main control board of the main device of the cluster system, to enable the main control board of the main device to respond to the request and to send the cluster configuration information to the switched fabric board; and
  when the main control board of the main device responds to the request and sends the cluster configuration information to the switched fabric board, receiving and saving, by the switched fabric board, the cluster configuration information sent by the main control board of the main device.

8. An apparatus for configuring a cluster system including a member device and a main device, wherein the member device comprises at least one monitoring module and at least one switched fabric board, and the apparatus comprises:
  a request answer signal sending unit, configured to enable a switched fabric board of the member device to send a request answer signal for requesting a main control board that receives the request answer signal to answer the request answer signal;
  a determining unit, configured to enable the switched fabric board of the member device to determine an address of a main monitoring module when the switched fabric board of the member device does not receive an answer signal of the request answer signal, wherein the main monitoring module is one of the at least one monitoring module, and wherein a result of the determining comprises that: the main monitoring module is located on one of the at least one switched fabric board; and
  a main monitoring module address sending unit, configured to, enable the switched fabric board to send the address of the main monitoring module to a main control board of the main device.

9. The apparatus according to claim 8, wherein,
  the determining unit is further configured to determine whether the switched fabric board on which the main monitoring module is located lacks cluster configuration information of the cluster system; and
  the apparatus further comprises:
  a cluster configuration information request sending unit, configured to, when the determining unit determines that the switched fabric board on which the main monitoring module is located lacks the cluster configuration information of the cluster system, enable the switched fabric board on which the main monitoring module is located to send a cluster configuration information request to the main control board of the main device of the cluster system, to enable the main control board of the main device to respond to the request and to send the cluster configuration information to the switched fabric board on which the main monitoring module is located; and
  a saving unit, configured to, when the main control board of the main device responds to the request and sends the cluster configuration information to the switched fabric board, enable the switched fabric board on which the main monitoring module is located to receive and save the cluster configuration information sent by the main control board of the main device.

10. The apparatus according to claim 9, wherein
  the saving unit is further configured to synchronously save the cluster configuration information on another switched fabric board of the member device.

11. The apparatus according to claim 9, wherein
  the determining unit is further configured to, when the switched fabric board detects the request answer signal sent by the main control board on the member device, determine that a monitoring module on the main control board is used as the main monitoring module;
  the cluster configuration information request sending unit is further configured to, when the determining unit determines that the monitoring module on the main control board is used as the main monitoring module, enable the main control board to send the cluster configuration information request to the main control board of the main device in the cluster system; and
  the saving unit is further configured to, when the main control board of the main device responds to the request and sends the cluster configuration information, enable the main control board of the member device to receive and save the cluster configuration information sent by the main control board of the main device.

12. The apparatus according to claim 8, wherein the determining unit is further configured to enable the switched fabric board of the member device to determine whether the switched fabric board of the member device is connected to a switched fabric board of the main device.

13. The apparatus according to claim 8, wherein the apparatus further comprises:
  a determining unit, configured to enable the switched fabric board to determine the address of the main monitoring module, wherein a result of the determining comprises that: the main monitoring module is independent of any of the at least one switched fabric board.

14. The apparatus according to claim 13, wherein
  the determining unit is further configured to determine that the main monitoring module is associated with one of the at least one switched fabric board, and determine whether the switched fabric board associated with the main monitoring module lacks cluster configuration information of the cluster system;
  the cluster configuration information request sending unit is further configured to, when the switched fabric board associated with the main monitoring module lacks the cluster configuration information of the cluster system, enable the switched fabric board which lacks the cluster configuration information of the cluster system to send a cluster configuration information request to the main control board of the main device of the cluster system, to enable the main control board of the main device to respond to the request and to send the cluster configuration information to the switched fabric board which lacks the cluster configuration information of the cluster system; and the saving unit is further configured to, when the main control board of the main device responds to the request and sends the cluster configuration information to the switched fabric board which lacks the cluster configuration information of the cluster system, enable the switched fabric board which lacks the cluster configuration information of the cluster system to receive and save the cluster configuration information sent by the main control board of the main device.

15. A cluster system comprising:
a main device,
a member device comprising at least one monitoring module and at least one switched fabric board, and
an apparatus comprising a processor and memory storing executable instructions, wherein the processor executes the instructions so as to be configured to enable a switched fabric board of the member device to: send a request answer signal for requesting a main control board that receives the request answer signal to answer the request answer signal;
determine an address of an main monitoring module when the switched fabric board of the member device does not receive an answer signal of the request answer signal, wherein the main monitoring module is one of the at least one monitoring module, wherein a result of the determining comprises that: the main monitoring module is located on one of the at least one switched fabric board, or the main monitoring module is independent of any of the at least one switched fabric board; and
send an address of the main monitoring module to a main control board of the main device.

16. An apparatus, the apparatus comprising
at least one switched fabric board;
a memory storing computer executable instructions; and
a processor in communication with the memory, wherein the processor execute the instructions so as to be configured to:
enable one of the at least one switched fabric board to send a request answer signal for requesting a main control board that receives the request answer signal to answer the request answer signal;
determine an address of an main monitoring module if the switched fabric board sending the request answer signal does not receive an answer signal of the request answer signal, wherein a result of the determining comprises that: the main monitoring module is located on one of the at least one switched fabric board, or the main monitoring module is independent of any of the at least one switched fabric board; and
send the address of the main monitoring module to a main control board of a main device.

17. The apparatus according to claim 16, wherein when the main monitoring module is located on the one switched fabric board of the switched fabric board, the processor is further configured to:
determine whether the switched fabric board on which the main monitoring module is located lacks cluster configuration information of the cluster system;
when the determining unit determines that the switched fabric board on which the main monitoring module is located lacks the cluster configuration information of the cluster system, enable the switched fabric board on which the main monitoring module is located to send a cluster configuration information request to the main control board of the main device of the cluster system, to enable the main control board of the main device to respond to the request and to send the cluster configuration information to the switched fabric board on which the main monitoring module is located; and
when the main control board of the main device responds to the request and sends the cluster configuration information to the switched fabric board, enable the switched fabric board on which the main monitoring module is located to receive and save the cluster configuration information sent by the main control board of the main device.

18. The apparatus according to claim 16, wherein when the main monitoring module is independent of any switched fabric board of the switched fabric board, the processor is further configured to:
determine that the main monitoring module is associated with one of the at least one switched fabric board, and determine whether the switched fabric board associated with the main monitoring module lacks cluster configuration information of the cluster system;
when the switched fabric board associated with the main monitoring module lacks the cluster configuration information of the cluster system, enable the switched fabric board which lacks the cluster configuration information of the cluster system to send a cluster configuration information request to the main control board of the main device of the cluster system, to enable the main control board of the main device to respond to the request and to send the cluster configuration information to the switched fabric board which lacks the cluster configuration information of the cluster system; and
when the main control board of the main device responds to the request and sends the cluster configuration information to the switched fabric board which lacks the cluster configuration information of the cluster system, enable the switched fabric board which lacks the cluster configuration information of the cluster system to receive and save the cluster configuration information sent by the main control board of the main device.

* * * * *